United States Patent [19]
Engquist

[11] Patent Number: 5,802,297
[45] Date of Patent: Sep. 1, 1998

[54] CLIENT-SERVER COMPUTER SYSTEM AND METHOD UTILIZING A LOCAL CLIENT DISK DRIVE AS A DATA CACHE

[75] Inventor: James D. Engquist, Colorado Springs, Colo.

[73] Assignee: Sun Microsystems, Inc., Palo Alto, Calif.

[21] Appl. No.: 497,290

[22] Filed: Jul. 3, 1995

[51] Int. Cl.$^6$ .................................................. G06F 12/00
[52] U.S. Cl. ............................ 395/200.42; 395/200.52
[58] Field of Search .................... 395/200.01, 200.54, 395/200.42, 200.33, 200.52

[56] References Cited

U.S. PATENT DOCUMENTS

| | | | |
|---|---|---|---|
| 4,887,204 | 12/1989 | Johnson | 395/200 |
| 4,897,781 | 1/1990 | Chang | 395/200 |
| 5,146,568 | 9/1992 | Flaherty | 395/325 |
| 5,162,986 | 11/1992 | Graber | 364/146 |
| 5,218,695 | 6/1993 | Noveck | 395/600 |
| 5,230,052 | 7/1993 | Dayan | 395/700 |
| 5,355,453 | 10/1994 | Row | 395/200 |
| 5,452,454 | 9/1995 | Basu | 395/700 |

FOREIGN PATENT DOCUMENTS 0 572 332 A1   12/1993   European Pat. Off. .

OTHER PUBLICATIONS

Smith, Alan Jay, "Cache Memories," *Computing Surveys*, vol. 14, No. 3, Sep. 1982, pp. 473–530.

"Cache File System (CacheFS) White Paper," SunSoft, Sun Microsystems, Inc., Revision A, Feb., 1994, Mountain View, CA, pp. 1–11.

Article Entitled "Andrew: A Distributed Personal Computing Environment" by J. H. Morris et al, Communications Of The ACM, Mar. 1986, vol. 29, No. 3 pp. 184–201.

IBM Technical Disclosure Bulletin, vol. 35, No. 1A, Jun. 1992, Entitled "AFS Initialization Performance Enhancement" pp. 217–218.

IBM Technical Disclosure Bulletin, vol. 36, No. 3, Mar. 1993, Entitled "Local Cache for Server Files", pp. 541–543.

*Primary Examiner*—Eric Coleman
*Attorney, Agent, or Firm*—William J. Kubida; Stuart T. Langley; Holland & Hart LLP

[57] ABSTRACT

A cache only client-server configuration which provides the performance benefits of "dataless" client operation with the administrative efficiencies of a "diskless" client-server configuration. Utilizing cache only clients, the performance of stand-alone systems can be approximated utilizing a relatively small disk drive as a local data cache. The cache only clients may be considered as interchangeable units in that they hold no critical data and any data held on the local disk is a "clone" of the master copy held on the server. System configuration, administration and maintenance costs are dramatically reduced since software installation, distribution and backup may be managed at the server.

28 Claims, 5 Drawing Sheets

CLIENT-SERVER COMPUTER SYSTEM AND METHOD UTILIZING A LOCAL CLIENT DISK DRIVE AS A DATA CACHE

BACKGROUND OF THE INVENTION

The present invention relates, in general, to the field of networked computer systems configured in a client-server relationship. More particularly, the present invention relates to a client-server computer system and method for operating the same utilizing a local disk drive at one or more client computers as a data cache and swap space for the root ("/") and user ("/usr") files associated with the client computer normally held in server computer mass storage.

Management information system ("MIS") managers have long been faced with the fundamental dilemma of administering a large number of distributed client computers while simultaneously maintaining network resources and their performance at acceptable levels. In conjunction with the objective of lowering the overall cost of managing such a distributed computing environment, system administrators have long recognized the need for techniques that would allow them to manage more clients per server as well as to replicate system support for a growing number of users.

In the past, centralization of system administration was used to address some of these aims. However, centralized system administration of prior client-server configurations has generally caused system performance trade-offs that were not acceptable. Thus, it has long been highly desirable to find a way to combine the benefits of centralized system administration with the higher performance demanded of current distributed computing resources. This is particularly the case with respect to system administration of UNIX® systems, where the need for centralization of desktop data is particularly acute.

Conventional approaches to client-server configurations that enable data centralization, such as "diskless" and "dataless" clients, frequently overwhelm networks and their associated servers with network "traffic" congestion. In these configurations, as additional client computers are added to a network file system, the load on the server and network tends to increase linearly. This is the primary reason servers and networks are so quickly saturated in a diskless client configuration. When servers and/or networks are overloaded the performance of all clients suffers and every time a new client is added to the configuration, the performance of all existing clients is even further degraded.

As a result, and in order to avoid these network overload problems, many sites install desktop computers as stand-alone machines. A stand-alone computer has its operating system installed on a local disk drive and, as the name implies, there is no reliance on a centralized server. As a result, the typical stand-alone desktop computer requires large amounts of disk space for the installation of operating system ("OS") components that may never be used. Although the performance of a stand-alone computer is very good and there are no scalability problems with completely independent units having no reliance on a server, because the OS must be individually loaded to each desktop computer and the data individually backed up at each location, this configuration is very difficult to administer.

SUMMARY OF THE INVENTION

Disclosed herein is a system and method for implementing a client-server computer system in which the local client disk drive is utilized as a data cache in a novel client-server workstation configuration that preserves the system administration advantages of traditional client-server configurations (both diskless and dataless) while addressing the shortcomings previously noted. The system and method of the present invention maintains data centralization and optimizes disk and network utilization by caching data that the client actually utilizes on a frequent basis. This substantially reduces demands otherwise placed on the network.

The introduction of a local disk cache on each client computer in accordance with the present invention, also reduces the client's demands on the server with a corresponding reduction in network and server load. A client can retrieve accessed files from a populated local disk drive cache with no server interaction and no additional server or network load.

Additionally, the system and method of the present invention provides a number of system management advantages over conventional approaches and installation of a client computer utilizing the local disk drive as a data cache is much quicker and simpler than a traditional stand-alone installation. All client data is centralized on the server obviating desktop backups. Moreover, since the data is centralized and loaded on-demand, individual client computer failures may be addressed by a relatively simple hardware replacement and network reboot. Still further, additional client computers may be added to a configuration in "batch" mode reducing an administrator's effort and the level of skill required as well as minimizing the wait time between each client installed.

Centralization of client data utilizing the system and method herein disclosed provides other important benefits to the system administrator in that client computers need not be individually backed up and may be treated as field replaceable units ("FRUs"). Further, in trouble shooting situations it is easy to view and modify client data from the server as well as to develop shell scripts that iteratively apply modifications to all clients.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

DESCRIPTION OF A PREFERRED EMBODIMENT

Figure 1A:
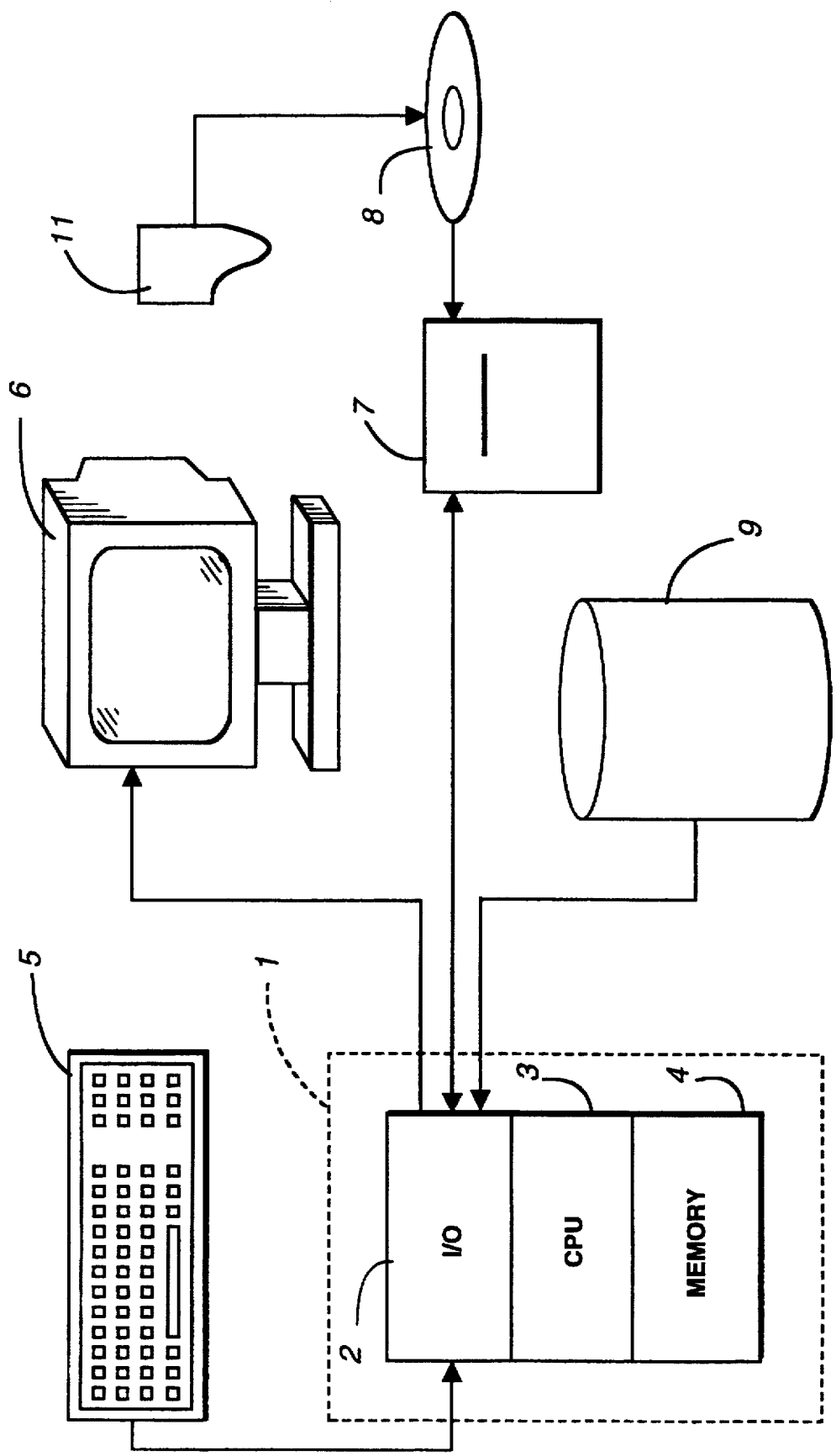
FIG. 1A is a simplified representational drawing of a general purpose workstation computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1A, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 11 and data. The computer program products containing mechanisms to effectuate the apparatus and methods of the present invention may reside in the memory section 4, or on a disk storage unit 9 or on the CDROM 8 of such a system.

Figure 1B:
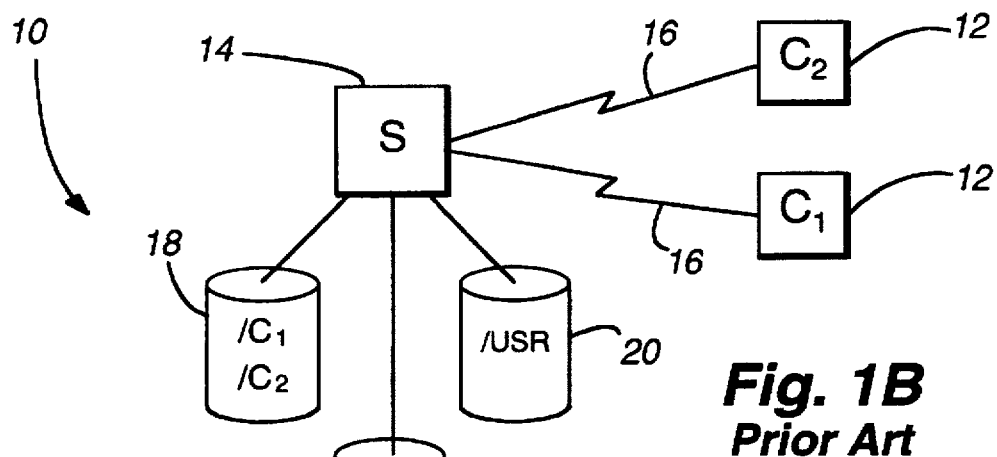
FIG. 1B is a simplified block diagram of a conventional "diskless" client-server computer configuration wherein the server maintains the root, common user and swap files for a given client computer and all data remotely from the networked client computers.

With reference now to FIG. 1B, a conventional "diskless" client-server configuration 10 is shown for purposes of comparison with the system and method of the present invention hereinafter described in more detail. The diskless client-server configuration 10 comprises, in pertinent part, a number of diskless client computers ("clients") 12 (denominated $C_1$ and $C_2$) bi-directionally interconnected for exchange of data with a server computer ("server") 14 by means of a network 16.

System-wide computer mass storage of data, files, application software and the like is maintained remotely from the diskless clients 12 and is associated directly with the server 14. In the simplified representative illustration shown, the client root file storage 18, /usr file storage 20, client data storage 22 and client swap area 24 is shown schematically as resident on various separate computer mass storage devices such as Winchester, "fixed", "rigid" or "hard" disk drives or related subsystems. The respective root, /usr, client data files and swap area may, of course, be physically stored together or separately on one or more computer mass storage device disk drives, subsystems or other storage media as is appropriate to the particular client-server system.

As is implied by its name, a diskless client 12 does not have an associated local disk drive and all client data resides on its server 14. The strongest aspect of the conventional diskless client-server configuration 10 is its relative ease of administration and diskless clients 12 are FRUs, do not require individual backup, their data can be modified from a central server 14 and software installation and upgrading is easily and quickly accomplished at the server 14.

On the other hand, the performance of the conventional diskless client-server configuration 10 is relatively poor and does not scale well. As additional diskless clients 12 are added to a network 16, the performance of all existing diskless clients 12 (as well as the server 14) is degraded. This performance degradation generally becomes intolerable before a reasonable number of clients 12 per server 14 may be reached. As to disk drive usage and cost, the conventional diskless client server configuration 10 has a meaningful advantage over other client-server configurations in that the individual diskless clients 12 do not have a local disk drive and are therefore less expensive to purchase than a comparable machine with an associated hard drive.

Figure 1C:
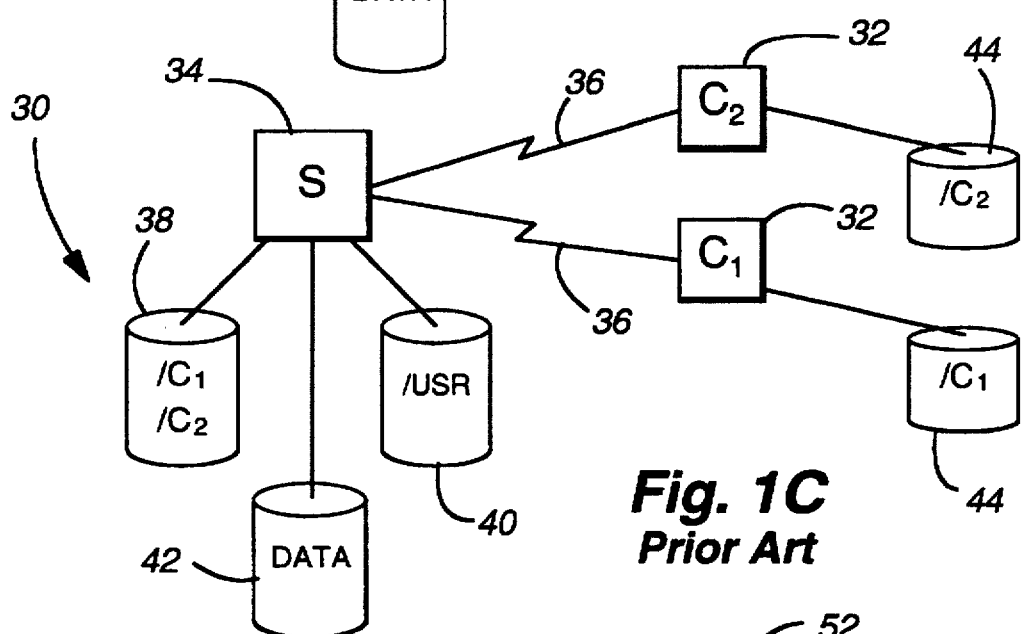
FIG. 1C is an additional, simplified block diagram of a conventional "dataless" client-server computer configuration wherein the server maintains common user files for a given client computer and all data remotely from the networked client computers while the clients maintain copies of their root and swap files on a local computer mass storage device disk drive.

With reference additionally now to FIG. 1C, a conventional "dataless" client-server configuration 30 is also shown for purposes of comparison with the system and method of the present invention hereinafter described in more detail. The dataless client-server configuration 30 comprises, in pertinent part, a number of dataless client computers ("clients") 32 (again denominated $C_1$ and $C_2$) bi-directionally interconnected for exchange of data with a server computer ("server") 34 by means of a network 36.

As with the diskless system of FIG. 1B, system-wide computer mass storage of data, files, application software and the like is also maintained remotely from the dataless clients 32 and is again associated directly with the server 34. In the simplified representative illustration shown, the /usr file storage 40 and client data storage 42 is shown schematically as resident on separate computer mass storage devices or subsystems. As before, they may, of course, be physically stored together or separately on one or more computer mass storage device disk drives, subsystems or other storage media as is appropriate to the particular client-server system.

The conventional dataless client-server configuration 30 is distinguished from the diskless client-server configuration 10 of FIG. 1B by the addition of swap and local root file storage 44 associated with each of the dataless clients 32. The local root file storage 44 contains a copy of the local root file system from the root file storage 38. The /usr file system from the /usr file storage 40 is mounted from the central server 34 and may be shared with other dataless clients 32.

A dataless client-server configuration 30 is relatively easy to administer although not as easy as the diskless client-server configuration 10 shown in FIG. 1B. For example, a dataless client 32 is not an FRU, it must be individually backed up and installation is relatively more complex. Performance of a dataless client-server configuration 30 is generally adequate and is much more scaleable than diskless configurations. Nevertheless, dataless clients 32 will still tend to contend with one another for access to the /usr file system of the /usr file storage 40 associated with the server 34. Computer mass storage cost is relatively low in this configuration and a dataless client 32 can use a relatively small and inexpensive local disk drive of on the order of 100 MBytes capacity for many current applications.

Figure 2:
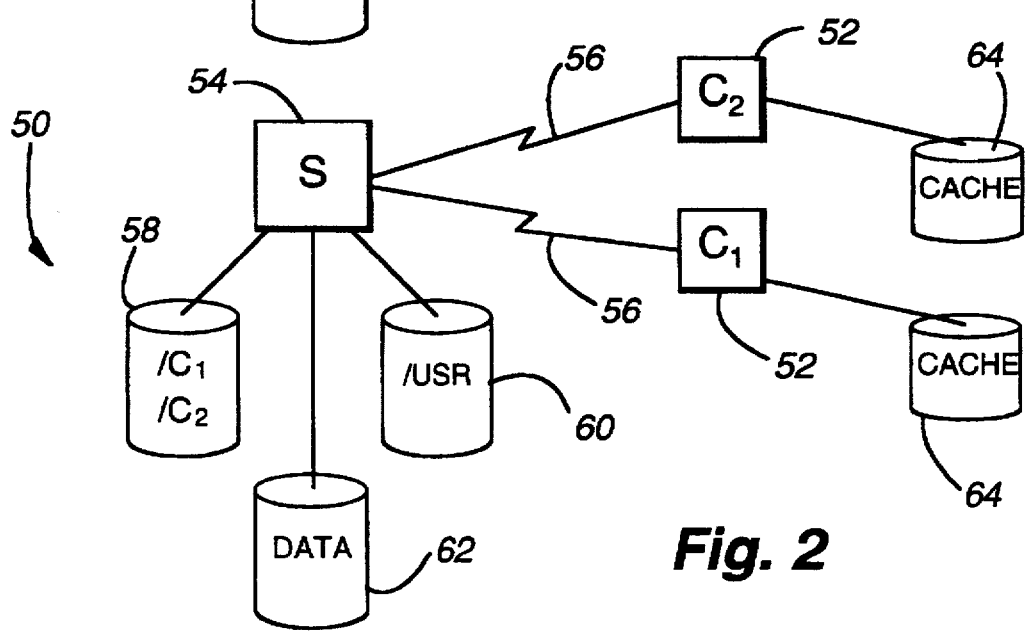
FIG. 2 is a simplified block diagram of a client-server computer system in accordance with the present invention wherein each client computer has an associated computer mass storage disk drive for use as a swap and local data cache for files accessed from the server computer over the network.

With reference now to FIG. 2, a simplified block diagram of a system and method for implementing a cache only client-server computer configuration 50 utilizing a local client disk drive as a data cache in accordance with the present invention is shown. The cache only client-server configuration 50 comprises, in pertinent part, a number of cache only client computers ("clients") 52 (also again denominated $C_1$ and $C_2$) bi-directionally interconnected with a server computer ("server") 54 by means of a network 56. In the configuration illustrated, the network 56 may utilize, for example, the network file system software, NFS® available from Sun Microsystems, Inc., assignee of the present invention.

System-wide computer mass storage of data, files, application software and the like is again maintained remotely from the cache only clients 52 and is associated directly with the server 54. In the simplified representative illustration shown, the client root file storage 58, /usr file storage 60 and client data storage 62 is again shown schematically as resident on separate computer mass storage devices or subsystems. As before, they may, of course, be physically stored separately or together on one or more computer mass storage device disk drives or other storage media as is appropriate to the particular client-server system.

The cache only client-server configuration 50 is distinguished from the diskless client-server configuration 10 of FIG. 1B by the addition of a swap area and local data cache 64 associated with each of the cache only clients 52 and from the dataless client-server configuration 30 of FIG. 1C by the fact that the /usr files are not the only files which might be stored locally at the client.

Cache only clients 52 may use relatively inexpensive local disk drives as small as 100 MBytes for swap and a local data cache 64 of recently used files from the root and /usr file systems accessed over the network 56. The combination of local swapping and local disk caching of frequently used files leads to a dramatic reduction in overall network traffic as compared to the conventional diskless client-server configuration 10 of FIG. 1B. Other read-mostly file systems, for example the /usr/local, could also be mounted in the same local data cache 64. More specific information regarding setting up these mounts in a specific implementation of the cache only client-server configuration 50 utilizing the Solaris™ OS and the CacheFS™ file system available from Sun Microsystems, Inc., 2550 Garcia Avenue, Mountain View, Calif. 94043-1100, assignee of the present invention, is described in the: Cache File System (CacheFS) White Paper, Revision A, February 1994.

The server 54 may be configured much like a conventional diskless or dataless server as shown in the preceding figures. There is a small root area for each cache only client 52, shown as root file system 58, typically requiring on the order of 15–20 MBytes of disk space per cache only client 52. The /usr file system maintained in the /usr files storage 60 is shared by all cache only clients 52 of the same architecture and OS revision. The server 54 may be configured to support cache only clients 52 of mixed architectures and/or mixed OS revisions. Unlike the conventional diskless client-server configuration 10 of FIG. 1B, there is no client swap space on the server 54. Since client swap files are generally significantly larger than client root directories, the cache only client-server configuration 50 achieves a substantial savings in server 54 disk space as compared to diskless systems and the server 54 need not be a particularly high powered computer. In a particular embodiment of a cache only client-server configuration 50 utilizing a SPARCstation™ IPC™ (trademarks of Sun Microsystems, Inc.) server 54 with 16 MBytes of random access memory ("RAM") was an effective server for more than thirty cache only client computers 52.

The local data cache 64 used by a cache only client 52 is strictly a "write-through" cache and all modifications to data are reflected directly to the server 54. Thus, there is never any critical data resident only at the cache only client 52. This fact presents two major administrative advantages in that there is no need to individually back up (or archive) data from the cache only clients 52 and they are FRUs. Moreover, it is easy to replace a given cache only client 52 with another client computer in the event of hardware upgrade or hardware failure. The replacement cache only client 52 assumes the "identity" of the client it replaces and all local configuration and customization, such as printer configuration, locally defined passwords and the like is preserved. When the replacement cache only client 52 is booted, its local data cache 64 is populated with the data that the previous client had stored on the server 54.

In a particular embodiment of the present invention implemented utilizing the Solaris OS, installation of the system may be effectuated utilizing the accompanying "install" technology. If the server 54 is to support cache only clients 52 of varying architectures, the architecture specific support may be selected at install time or installed after the fact using [swmtool]. The Solaris OS install program reserves disk space for the client root areas after asking how many clients will be supported. Like a diskless client 12 (FIG. 1B), a typical cache only client root area will consume on the order of 15–20 MBytes of server 54 disk space.

In a particular implementation of the cache only client-server configuration 50, the installation of a cache only client 52 may be performed entirely on the server 54 using the Solstice AutoClient™ manager application also available from Sun Microsystems, Inc. The user of the Solstice AutoClient manager, which is typically the system administrator, need only respond to a few simple questions per cache only client 52 relating to host name, IP address, ethernet address, disk configuration, swap size and the like. The Solstice AutoClient manager further supports the addition of cache only clients 52 in "batches" allowing the administrator to complete all interaction before any of the cache only clients 52 are actually installed rather than waiting for one cache only client 52 to complete before adding the next one. Moreover, the cache only client 52 hardware need not be available, or even powered on, during the installation process. After the installation process completes, the cache only client 52 simply does a "boot net".

A cache only client 52 implements a network boot. The early part of the boot (loading the kernel) is always done over the network 56. Early in the boot process, the local data cache 64 is configured and "plugged in." At this point, population of a newly created local data cache 64 can begin. If this process involves a reboot of a machine that already had a previously created local data cache 64, files in it may be used at this point. Using files from the local data cache 64 instead of retrieving them over the network 56 results in a dramatic reduction in network 56 traffic and server 54 load.

Figure 3:
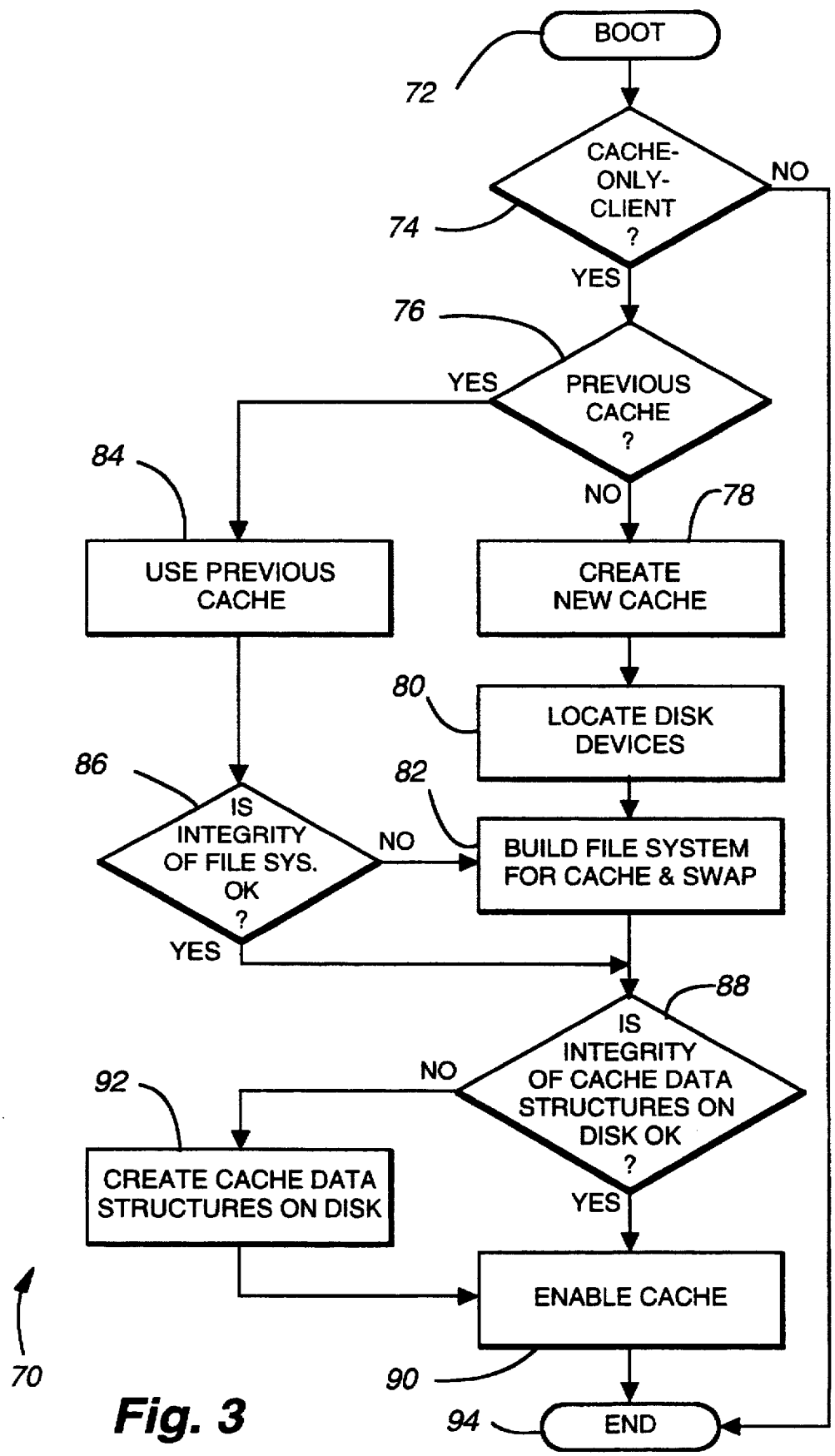
FIG. 3 is a simplified flowchart of a boot-up procedure for implementing the system and method of the present invention by building the file systems for a cache and swap space on a local disk drive of a client computer.

With reference additionally now to FIG. 3, a representative process flow for enabling a cache only client during a boot sequence 70 is shown. The boot sequence 70 begins at start step 72 and then, at decision step 74, a determination is made as to whether the client computer is intended to be a cache only client 52 or have an alternative configuration with respect to the server 54 such as a diskless client 12 (FIG. 1B), dataless client 32 (FIG. 1C) or stand-alone computer. If the client computer is not to be configured as a cache only client 54, the process proceeds directly to end step 94 as shown.

Alternatively, if the client computer is to be configured as a cache only client 52, then the boot sequence 70 continues to decision step 76 where a determination is made as to whether or not the client computer has been previously configured as a cache only client 52 due to the presence or absence of a previously implemented local data cache 64. If a previous local data cache 64 is not found, the steps to implement a new cache are begun at step 78 and the attached computer mass storage disk drive is located at step 80. Once the local disk drive has been identified, the file systems for the cache and swap are constructed at step 82.

On the other hand, if at decision step 76, a previous local data cache 64 is found, the steps to implement the previous local data cache 84 is begun at step 84. The previous local data cache 64 is tested at decision step 86 as to the integrity of the existing file system. If the integrity of the file system does not check out, the boot sequence 70 proceeds to step 82 to build the necessary file systems for the cache and swap as previously described, then to proceed to decision step 88. Should the file integrity of the previous local data cache 64 be confirmed, the boot sequence proceeds directly to decision step 88 to test the integrity of the cache data structures on the local disk drive.

If the integrity of the cache data structures does not check out, the requisite cache data structures are created on the attached local disk drive at step 92 and the cache enabled at step 90. Alternatively, if the integrity of the cache data structures is confirmed at decision step 88, the boot sequence 70 continues directly to step 90 to enable the cache. In either event, the boot sequence 70 concludes at step 94.

Figure 4:
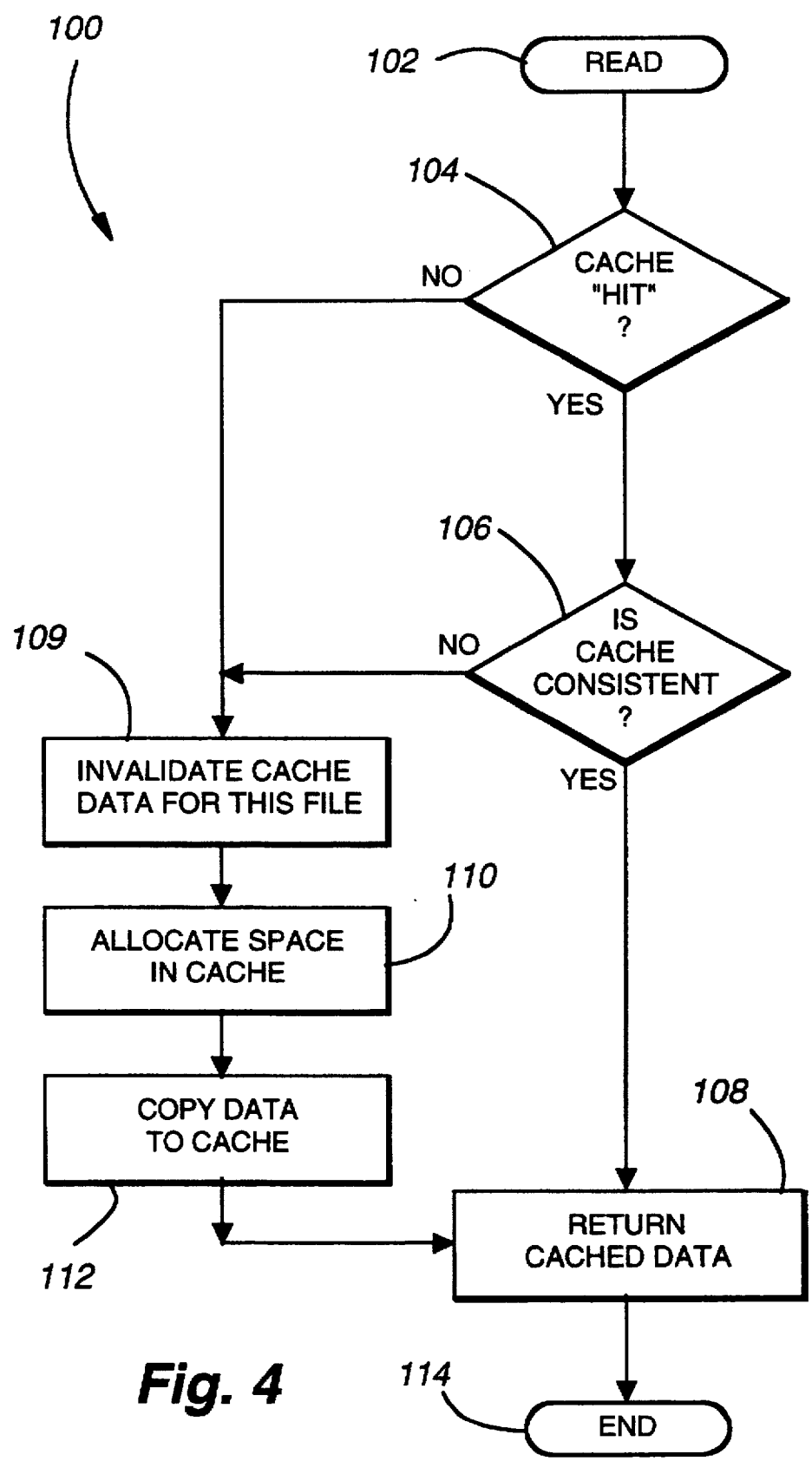
FIG. 4 is a simplified flowchart of a "read" operation directed to the data cache of a client computer utilizing the local disk drive as a cache in accordance with the present invention.

With reference additionally now to FIG. 4, a representative "read" sequence 100 is shown as may be conducted by a cache only client 52. The read sequence 100 begins at start step 102 and proceeds to a decision step 104 to determine whether or not the data requested to be read is already in the local data cache 64 (a cache "hit") or is not currently in the local data cache 64 (a cache "miss"). If the requested data is in the local data cache 64, the read sequence 100 continues to decision step 106 to determine whether or not the data in the cache is consistent. If the read operation is a cache hit at decision step 104 and is determined to be consistent at decision step 106, the read sequence 100 proceeds to step 108 to return the cached data requested and the read sequence 100 concludes at end step 114.

On the other hand, if at decision step 104 the data is not currently in the local data cache 64, or at decision step 106 the data is in the local data cache 64 but is not consistent, the read sequence continues at step 109.

At step 109 the cache data for the particular file to be read is invalidated and space is allocated in the local data cache 64 for the requested data at step 110. The data read from the server 54 over the network 56 is then copied to the local data cache 64 at step 112 and the cached data returned at step 108 to proceed to end step 114.

Figure 5:
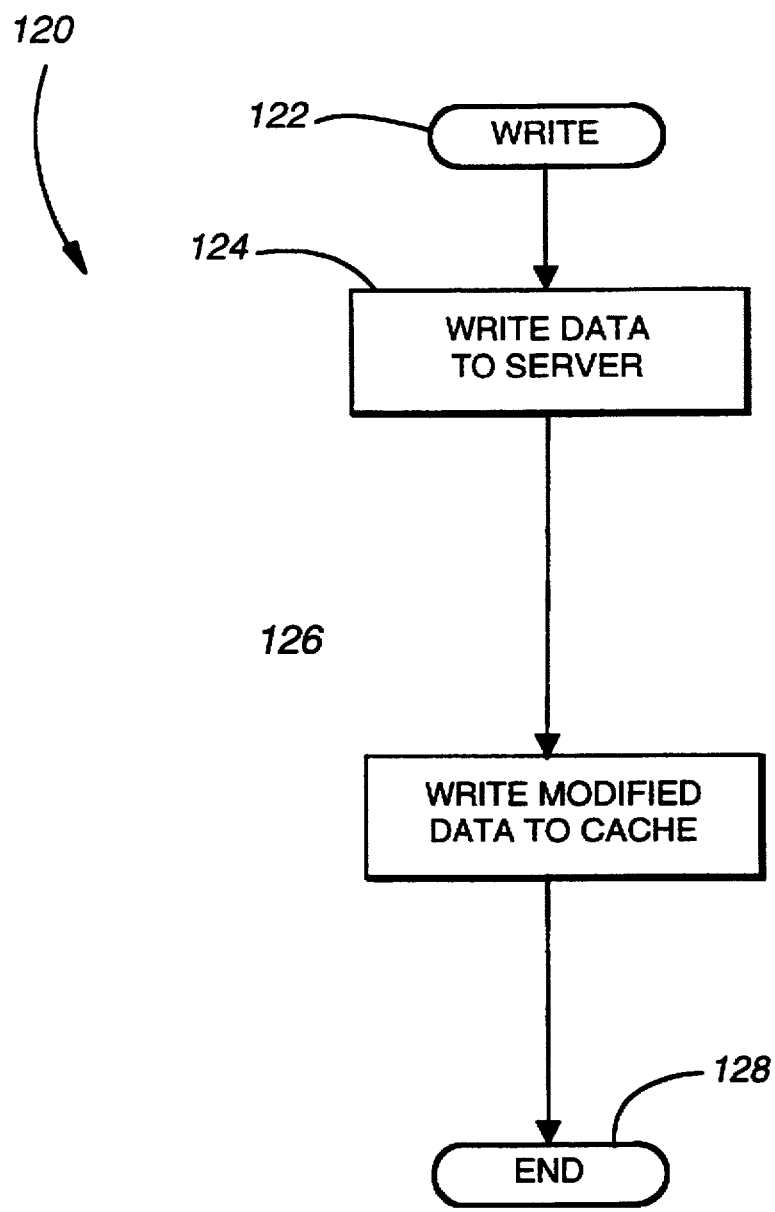
FIG. 5 is a further, simplified flowchart of a "write" operation to the cache of a client computer utilizing the local disk drive as a data cache wherein the data is also initially written-through the cache to the network server computer.

With further reference additionally now to FIG. 5, a representative "write" sequence 120 is shown. Write sequence 120 begins at start step 122 and proceeds to step 124 wherein the modified data to be written is first written directly to the server 54 over the network 56. Following this "write-around" operation, the modified data is then written to the local data cache 64 at step 126 and the write sequence 120 concludes at end step 128. As can be seen, in a write operation, the cache only client 52 may make no determination as to whether or not the modified data may already exist in the local data cache 64 and all "writes" are first to the server 54 and then to the local data cache without regard to a cache "hit" or "miss". In this manner, the modified data is always available at the server 54 for ease of system administration.

In operation, files in the root and /usr file systems from the root file storage 58 and /usr file storage 60 respectively, are copied to the local data cache 64 disk drive as they are referenced. Virtually any action on a file will cause it to be copied to the local data cache 64 such as invocation of an executable file, read of a text file and the like. In this regard, it's important to note that large portions of the OS distribution are never accessed by most users and this means that this data is never copied to their local data cache 64 disk drive. Thus, the local data cache 64 disk drive can be much smaller in capacity than the disk drive that would be required for a local installation of the OS.

Once data has been copied to the local data cache 64, no server 54 interaction is required to reference it again other than as noted hereinafter. A subsequent access to cached data may be faster than a network 56 access, and results in a reduction in the load placed on the server 54 and the network 56.

With the Solstice AutoClient implementation of a cache only client 52, a new cache consistency mode has been added to the CacheFS consistency model described in the aforedescribed CacheFS white paper. This consistency mode is called [demandconst]. This mode assumes that files are not generally being changed on the server 54, and that if they ever are changed someone (typically the system administrator) will explicitly request a consistency (or cache coherency) check. Thus, no consistency checking is performed unless a check is explicitly requested. Nevertheless, there is an implied consistency check when a CacheFS file system is mounted (when the Solstice AutoClient client boots) and a Solstice AutoClient cache only client 52 is configured by default to request a consistency check every 24 hours via [cron(1)]. This model improves Solstice AutoClient cache only client 52 performance as a lot of network 56 latency is avoided by skipping consistency checking. The risk of inconsistent data is minimal as the cache only client 52's root area is exported only to that particular cache only client 52. There is no local data cache 64 inconsistency when the cache only client 52 modifies its own data since such modifications are made through the local data cache 64. The only other way a cache only client 52's root data can be modified is by the super user on the server 54. Presumably this operation would be done by the system administrator when, for example, installing new software. The /usr file system in the /usr file storage 60 is similar in that the server 54 exports it read-only, so the only way it is likely to be modified is by the system administrator on the server 54. In these cases, it is reasonable to require the system administrator to initiate a consistency check on the cache only client 52's behalf. The [autosync(1 m)] command is provided for this purpose and may be run on the cache only clients 52 as well as the server 54 in case the cache only clients 52 cannot wait for the system administrator's intervention or the 24 hour interval.

Except for enhanced performance, a cache only client 52 functions no differently from an end user's viewpoint than any other client-server configuration and a cache only client 52 appears to be just another computer with all conventional OS capabilities being supported. In a particular embodiment of the present invention utilizing the Solstice AutoClient product, a cache only client 52 was booted, openwindows started, and xterm, mailtool, calendar manager, xclock and FrameMaker™ were run while filling only 24 MBytes of local data cache 64 space.

In benchmark testing running desktop applications such as mailtool, cmdtool, calendar manager, file manager, xterm and xclock, a stand-alone configuration completed the benchmark in the least time. However, the average time for a cache only client-server configuration 50 was only 1.27 times that of the stand-alone configuration. On the other hand, the average time for a conventional dataless client-server configuration 30 (FIG. 1C) was 1.5 times that of the stand-alone configuration while the average time for a conventional diskless client-server configuration 10 (FIG. 1B) was 4 times that of the same stand-alone setup.

In general, the cache only client-server configuration 50 provides great ease of system administration and since the cache only clients 52 are FRUs, they don't require individual backup, their data can be modified from a central server 54, and installation is easily and quickly accomplished from the server 54. As noted above, the overall system performance achieved is very good and the use of a local disk drive for swap and caching of frequently accessed files provides a substantial performance boost over diskless systems. Performance is also better than dataless systems since the local data cache 64 reduces server 54 requests for /usr files. The cache only client 52 can use a relatively small capacity local disk drive of on the order of 100 MBytes for the local data cache 64.

While there have been described above the principles of the present invention in conjunction with specific computer hardware, operating and network file systems software and overall system configurations and process flows, it is to be clearly understood that the foregoing description is made only by way of example and not as a limitation to the scope of the invention.

What is claimed is:

1. A client-server computer system comprising:
at least one server computer coupled to a network for transferring and receiving data thereover, said server computer having at least one associated server mass storage device to which said data may be written and from which said data may be read; and
at least one client computer coupled to said network for transferring and receiving said data thereover, said client computer having at least one associated client mass storage device to which said data may be written and from which said data may be read;
root files associated with said client computer and stored in said server mass storage device, wherein said client mass storage device is at least partially configurable as a local data cache for at least some of said root files.

2. The client-server computer system of claim 1 wherein a requested data access initiated by said client computer will be directed to said local data cache.

3. The client-server computer system of claim 2 wherein a read access operation of said requested data will be directed to said local data cache if said requested data is currently in said local data cache.

4. The client-server computer system of claim 2 wherein a read operation of said requested data will be directed to said server if said requested data is not currently in said local data cache.

5. The client-server computer system of claim 2 wherein a read operation of said requested data will be directed to said server if said requested data is currently in said local data cache but is not coherent with said requested data at said server computer.

6. The client-server computer system of claim 4 wherein said requested data obtained from said server is further written to said local data cache.

7. The client-server computer system of claim 2 wherein a write access operation of modified data will be directed to said server computer and said modified data also written to said local data cache.

8. The client-server computer system of claim 6 wherein a subsequent read access operation of said modified data will be directed to said local data cache.

9. The client-server computer system of claim 1 wherein said client computer is capable of initiating a network boot operation in response to which said server computer transfers at least a portion of an operating system over said network to said local data cache in said client mass storage device to effectuate said boot of said client computer whereupon data subsequently read from said server mass storage device over said network by said client computer is also written to said data cache.

10. The client-server computer system of claim 1 wherein modified data written to said server mass storage device over said network by said client computer is also written to said data cache.

11. A process for accessing data in a client-server computer system having at least one server computer and at least one client computer coupled to a network for transferring and receiving information thereover wherein said server computer and said client computer each have at least one associated server and client mass storage device respectively to which data may be written and from which data may be read, said client mass storage device being at least partially configurable as a local data cache, the process comprising the steps of:
providing root files associated with said client computer and stored in said server mass storage device;
providing for initiation of a requested data read operation by said client computer to access said root files;
providing for determining whether said requested data is currently in said local data cache; and
providing for returning said requested data to said client computer from said local data cache if said requested data is currently in said local data cache.

12. The process of claim 11 further comprising the step of:
providing for requesting said requested data from said server computer if said requested data is not currently in said data cache.

13. The process of claim 12 further comprising the step of:
providing for writing said requested data from said server computer to said local data cache following said step of providing for requesting.

14. The process of claim 13 further comprising the step of:
providing for allocating space in said local data cache for said requested data prior to said step of providing for writing.

15. The process of claim 11 further comprising the step of:
providing for determining a coherency between said requested data and said requested data in said local data cache prior to said step of providing for returning.

16. A process for establishing a data cache associated with a client computer in a client-server computer system, said client computer having at least one client mass storage device to which data may be written and from which data may be read, said client mass storage device being at least partially configurable as said data cache, said process comprising the steps of:
providing for locating of said client mass storage device;
providing for determining a presence of a previously created data cache;
providing for building a file system for said data cache; and
providing for enabling of said data cache.

17. The process of claim 16 further comprising the steps of:
providing for determining a presence of a previously created data cache;
providing for checking an integrity of one or more file systems of said previously created data cache; and
providing for utilization of said previously created data cache.

18. The process of claim 16 further comprising the step of:

providing for checking an integrity of one or more cache data structures on said client mass storage device; and providing for creating of said one or more cache data structures prior to said step of providing for enabling of said data cache.

19. A client computer couplable to a server computer by means of a network for intercommunication of data therebetween, said client computer capable of performing a network boot operation wherein at least a portion of an operating system is transferred to said client computer from said server computer over said network, said client computer comprising:

a local mass storage device capable of being at least partially configured as a data cache;

wherein said network boot operation initiated by said client computer effectuates transfer of said portion of said operating system from said server to said client computer and copying of said portion of said operating system to said data cache such that subsequent requests for said portion of said operating system are directed to said data cache.

20. The client computer of claim 19 wherein a data write operation initiated by said client computer effectuates transfer of modified data to said server and copying of said modified data to said data cache.

21. A computer program product comprising:

a computer usable medium having computer readable code embodied therein for implementing accessing of data in a client-server computer system having at least one server computer and at least one client computer coupled to a network, said server and client computers each having at least one associated server and client mass storage device respectively to which data may be written and from which data may be read, said client mass storage device being at least partially configurable as a local data cache;

computer readable program code devices configured to cause a computer to provide root files associated with said client computer and stored in said server mass storage device;

computer readable program code devices configured to cause a computer to effect initiation of a requested data read operation by said client computer to access said root files;

computer readable program code devices configured to cause a computer to effect determination of whether said requested data is currently in said local data cache; and computer readable program code devices configured to cause a computer to effect returning of said requested data to said client computer from said local data cache if said requested data is currently in said local data cache.

22. The computer readable program code devices of claim 21 further comprising:

computer readable program code devices configured to cause a computer to effect requesting of data from said server computer if said requested data is not currently in said data cache.

23. The computer readable program code devices of claim 21 further comprising:

computer readable program code devices configured to cause a computer to effect writing said requested data from said server computer to said local data cache.

24. The computer readable program code devices of claim 22 further comprising:

computer readable program code devices configured to cause a computer to effect allocation of space in said local data cache for said requested data.

25. The computer readable program code devices of claim 21 further comprising:

computer readable program code devices configured to cause a computer to effect determination of coherency between said requested data and said requested data in said local data cache.

26. A computer program product comprising:

a computer usable medium having computer readable code embodied therein for implementing an establishment of a data cache associated with a client computer in a client-server computer system, said client computer having at least one client mass storage device to which data may be written and from which data may be read, said client mass storage device being at least partially configurable as said data cache;

computer readable program code devices configured to cause a computer to effect location of said client mass storage device;

computer readable program code devices configured to cause a computer to effect determination of a presence of a previously created data cache;

computer readable program code devices configured to cause a computer to effect building of a file system for said data cache; and computer readable program code devices configured to cause a computer to effect enablement of said data cache.

27. The computer program product of claim 26 further comprising:

computer readable program code devices configured to cause a computer to effect checking an integrity of one or more file systems of said previously created data cache; and computer readable program code devices configured to cause a computer to effect utilization of said previously created data cache.

28. The computer program product of claim 27 further comprising:

computer readable program code devices configured to cause a computer to effect checking an integrity of one or more cache data structures on said client mass storage device; and computer readable program code devices configured to cause a computer to effect creation of said one or more cache data structures.

* * * * *